United States Patent
Sottiaux et al.

(10) Patent No.: US 9,352,829 B2
(45) Date of Patent: May 31, 2016

(54) AIRCRAFT WITH PROTECTIVE NANOCOATING

(71) Applicant: Bell Helicopter Textron Inc., Fort Worth, TX (US)

(72) Inventors: Daniel P. Sottiaux, Flower Mound, TX (US); Frank Bradley Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 649 days.

(21) Appl. No.: 13/789,273

(22) Filed: Mar. 7, 2013

(65) Prior Publication Data

US 2014/0252157 A1 Sep. 11, 2014

(51) Int. Cl.
| | |
|---|---|
| B64C 27/35 | (2006.01) |
| F16C 33/12 | (2006.01) |
| F16C 33/04 | (2006.01) |
| B64D 45/00 | (2006.01) |

(52) U.S. Cl.
CPC ............... *B64C 27/35* (2013.01); *F16C 33/04* (2013.01); *F16C 33/121* (2013.01); *B64D 2045/009* (2013.01)

(58) Field of Classification Search
CPC .. B64D 2045/009; B64C 27/35; F16C 33/121
See application file for complete search history.

(56) References Cited

U.S. PATENT DOCUMENTS

| | | | |
|---|---|---|---|
| 4,155,896 A | 5/1979 | Rennier et al. | |
| 4,429,341 A | 1/1984 | King | |
| 4,623,951 A | 11/1986 | DuPont et al. | |
| 4,824,713 A | 4/1989 | Brick | |
| 4,886,419 A | 12/1989 | McCafferty | |
| 5,186,686 A * | 2/1993 | Staples et al. | 464/69 |
| 5,248,517 A | 9/1993 | Shrier et al. | |
| 5,665,274 A | 9/1997 | Long et al. | |
| 5,791,592 A | 8/1998 | Nolan et al. | |
| 2004/0010843 A1 | 1/2004 | Erdmann et al. | |
| 2004/0051082 A1 | 3/2004 | Child et al. | |
| 2006/0148971 A1* | 7/2006 | Jing et al. | 524/520 |

(Continued)

FOREIGN PATENT DOCUMENTS

| | | |
|---|---|---|
| CN | 101928939 | 12/2010 |
| WO | 98/49057 | 11/1998 |

(Continued)

OTHER PUBLICATIONS

S. Alkis, T. ÖztaÖztaş ,L. E. Aygün, F. Bozkurt, A. K. Okyay and B. OrtaOrtaç, "Thin film MoS2 nanocrystal based ultraviolet photodetector" 2012, Optical Society of America, Abstract and Introduction.*

(Continued)

*Primary Examiner* — Nicholas McFall

(74) *Attorney, Agent, or Firm* — Fish & Richardson P.C.

(57) ABSTRACT

An aircraft component has an exterior surface and a protective nanocoating carried by the exterior surface. An aircraft has an engine, a fuselage, and a component having an exterior surface and a protective nano coating carried by the exterior surface. A method of protecting an aircraft component includes selecting at least one harmful environmental component and applying a protective nanocoating to the aircraft component, wherein the protective nanocoating is configured to protect the aircraft component from the selected harmful environmental component.

20 Claims, 5 Drawing Sheets

FIG. 3

(56) References Cited

U.S. PATENT DOCUMENTS

| | | |
|---|---|---|
| 2007/0184261 A1 | 8/2007 | Donnadieu |
| 2009/0227162 A1 | 9/2009 | Kruckenberg et al. |
| 2010/0040864 A1* | 2/2010 | McGilvray et al. ............ 428/323 |
| 2010/0230529 A1* | 9/2010 | Stamps et al. ............. 244/17.11 |
| 2010/0270513 A1 | 10/2010 | Haylock et al. |
| 2011/0017867 A1 | 1/2011 | Simmons et al. |
| 2011/0049292 A1 | 3/2011 | Kruckenberg et al. |
| 2011/0088923 A1 | 4/2011 | Cawse et al. |
| 2011/0140052 A1 | 6/2011 | Somasiri et al. |
| 2011/0160372 A1 | 6/2011 | Youm et al. |
| 2011/0206303 A1 | 8/2011 | James |
| 2012/0138589 A1 | 6/2012 | Mitchell et al. |
| 2012/0202047 A1 | 8/2012 | Welch et al. |
| 2012/0261182 A1 | 10/2012 | Megaridis et al. |
| 2013/0009001 A1 | 1/2013 | Gerken et al. |
| 2013/0082214 A1 | 4/2013 | Sharaby et al. |
| 2013/0087655 A1 | 4/2013 | Eddy |
| 2013/0134364 A1 | 5/2013 | Hansen et al. |
| 2013/0149934 A1 | 6/2013 | Sang et al. |
| 2013/0266795 A1 | 10/2013 | Schultz et al. |
| 2013/0344314 A1 | 12/2013 | Shokri et al. |
| 2014/0132289 A1 | 5/2014 | Grossman et al. |

FOREIGN PATENT DOCUMENTS

| | | |
|---|---|---|
| WO | 2008/048705 | 4/2008 |
| WO | 2011/062639 | 5/2011 |
| WO | 2012/145750 | 10/2012 |
| WO | 2012145750 A2 | 10/2012 |

OTHER PUBLICATIONS

Communication from a Counter-Part Application; Extended European Search Report; European Application No. EP 13164894.1; Jun. 11, 2013; 7 pgs.

Extended European Search Report issued in European Application No. 13164894.1 on Jun. 11, 2013; 7 pages.

Communication Pursuant to Article 94(3) EPCS issued on Feb. 11, 2015; 4 pages.

Extended European Search Report issued in European Application No. 13165369.3 on Jun. 11, 2013; 10 pages.

Polyester Matrix Composite reinforced by glass fibers (Fiberglass), Jun. 3, 2012, SubsTech, Accessed Jul. 23, 2014, http://www.substech.com/dokuwiki/doku.php?id=polyester_matrix_composite_reinforced_by_glassfibersfiberglass.

Communication Pursuant to Article 94(3) issued in European Application No. 13165369.3 on Jan. 27, 2015; 4 pages.

Office Action issued in U.S. Appl. No. 13/789,269 on Aug. 20, 2014; 11 pages.

* cited by examiner

AIRCRAFT WITH PROTECTIVE NANOCOATING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Aircraft components may be exposed to oils, ultraviolet radiation, and/or ozone. In some cases, aircraft components may degrade, change a performance characteristic, and/or prematurely fail as a result of exposure to oils, ultraviolet radiation, and/or ozone. Some aircraft, such as, but not limited to, helicopters, comprise elastomeric components (e.g., shear bearings, dampers, seals, and/or boots) that may be degraded in response to exposure to oils, ultraviolet radiation, and/or ozone. Some aircraft components may comprise a relatively thick and/or inflexible external coating configured to protect the components from oils, ultraviolet radiation, and/or ozone. However, the external coating may require application of a primer coating prior to application of the coating, the external coating thickness may lead to breakage when flexed, and/or the external coating may obscure signs of component wear or damage that would otherwise be noticeable by visual inspection. In some other aircraft components comprising elastomeric components, oleophobic, ultraviolet radiation resistant, and/or ozone resistant elements may be intermingled, dispersed, mixed, impregnated within, and/or otherwise integrated into the elastomeric component near an outer surface of the elastomeric component. In some cases, the above-described integration of oleophobic, ultraviolet radiation resistant, and/or ozone resistant elements may undesirably affect a performance and/or service life of the elastomeric components into which they are integrated.

SUMMARY

In some embodiments of the disclosure, an aircraft component is disclosed as comprising an exterior surface and a protective nanocoating carried by the exterior surface.

In other embodiments of the disclosure, an aircraft is disclosed as comprising an engine, a fuselage, and a component comprising an exterior surface and a protective nanocoating carried by the exterior surface.

In still other embodiments of the disclosure, a method of protecting an aircraft component is disclosed as comprising selecting at least one harmful environmental component and applying a protective nanocoating to the aircraft component, wherein the protective nanocoating is configured to protect the aircraft component from the selected harmful environmental component.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide an elastomeric component of an aircraft with a protective nanocoating (PN) to at least one of protect the elastomeric component from degradation and/or alteration of a functional characteristic of the elastomeric component as a result of exposure to at least one of oils, ultraviolet radiation, ozone, and/or other elastomeric-degrading environments. In some embodiments, a PN may be provided to an elastomeric component that consistently provides one or more of the above-described protections even though the elastomeric component may flex. In some cases, a PN may be provided to an elastomeric component that allows the above-described flexure without being predisposed to chipping and flaking and without visually obscuring signs of elastomeric component wear and/or damage. Throughout this disclosure, a nanocoating may be defined as a coating comprising at least one of (1) a thickness comprising a dimension between about 0.1 nanometers to about 200 nanometers and (2) constituent particles comprising a dimension between about 0.1 nanometers to about 200 nanometers.

Figure 1:
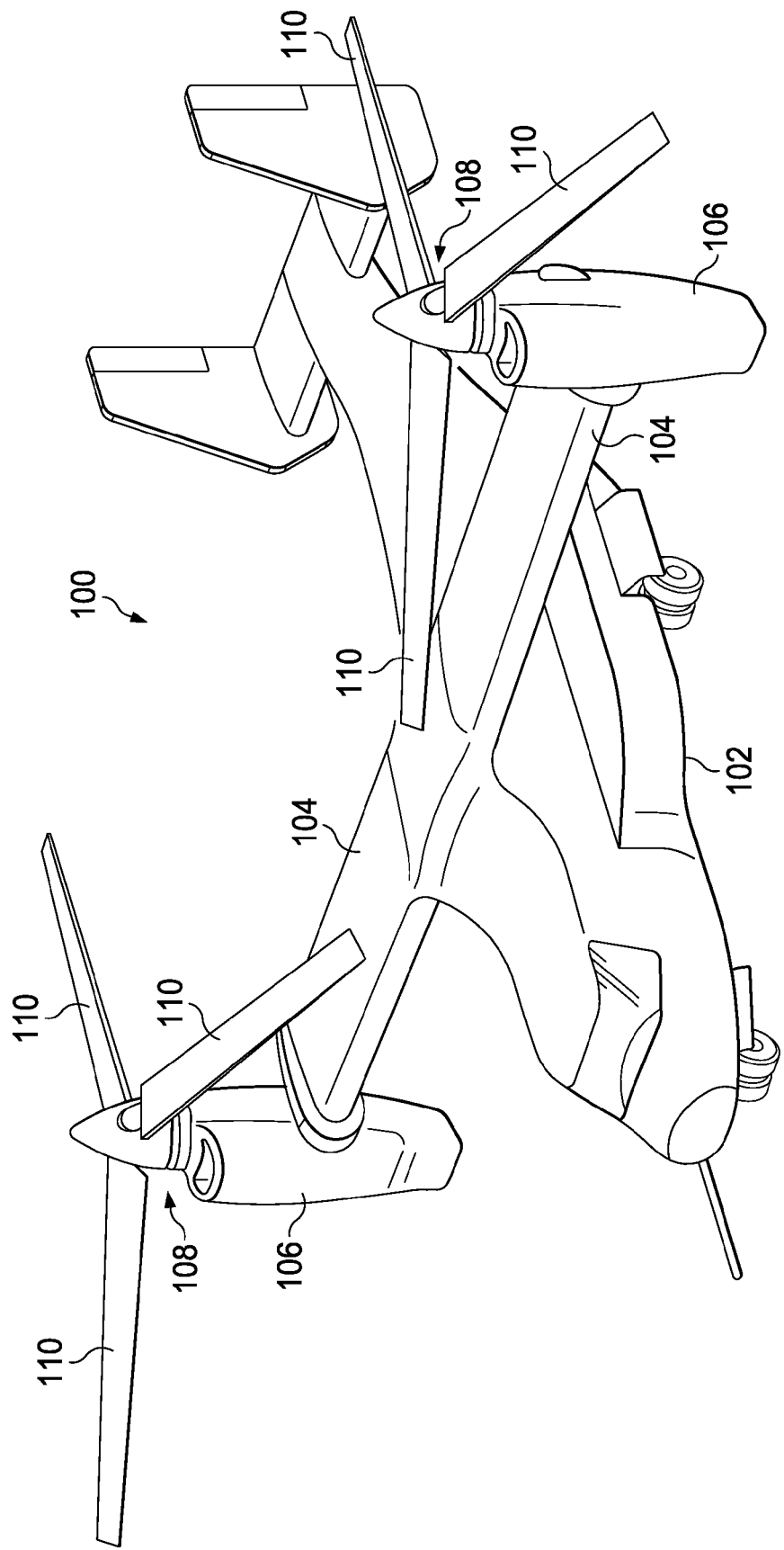
FIG. 1 is an oblique view of an aircraft according to an embodiment of the disclosure.

Referring now to FIG. 1, a tiltrotor rotary-wing aircraft 100 comprising a PN 200 is shown. The aircraft 100 is shown in a helicopter mode of flight operation. The aircraft 100 comprises a fuselage 102, wings 104, nacelles 106, and rotor systems 108. The wings 104 are attached to the fuselage 102 and carry the nacelles 106. The nacelles 106 may substantially enclose and/or carry engines and/or transmissions for powering the rotor systems 108. The rotor systems 108 may comprise composite components such as, but not limited to, a composite hub, composite rotor blades 110, elastomeric dampers, elastomeric bearings, and/or any other suitable component. Some of the above-described components may generally be relatively more sensitive to exposure to oils, ultraviolet radiation, and/or ozone as compared to other components of the aircraft 100. In some embodiments, the PN 200 may be provided to an exterior surface of one or more of the fuselage 102, wings 104, nacelles 106, rotor systems 108, and/or rotor blades 110 and/or any component of the aircraft 100, fuselage 102, wings 104, nacelles 106, rotor systems 108, and/or rotor blades 110. Further, the PN 200 may be provided to an exterior surface of one or more elastomeric components (e.g., elastomeric elements of bearings, dampers, seals, boots, electrical wiring insulators/casings, electrical harnesses) and/or any other suitable aircraft component that may benefit from the protection provided by the PN 200 regardless of whether the component is located inside the aircraft 100 or exposed to the environment surrounding the aircraft 100.

Figure 2:
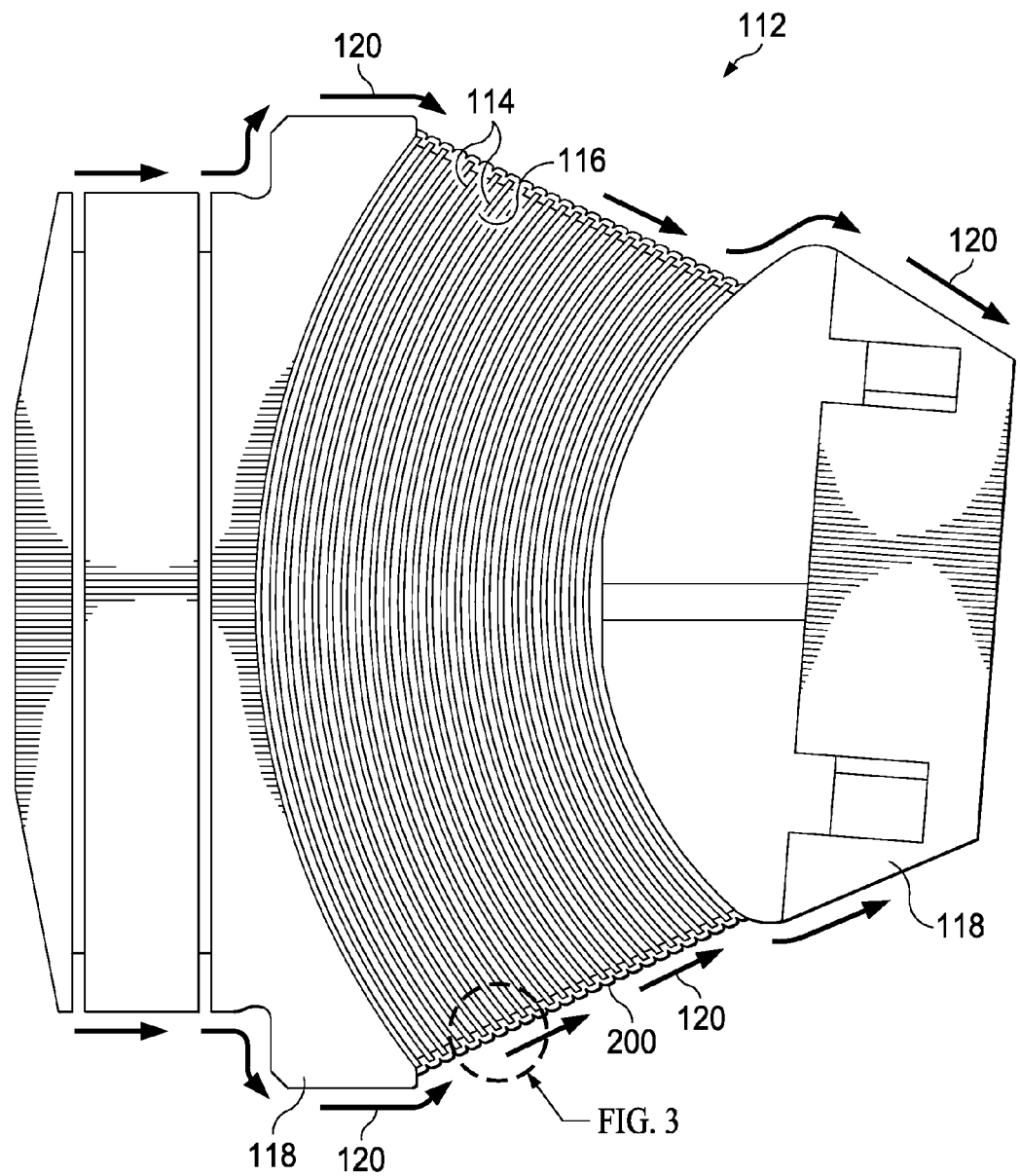
FIG. 2 is an orthogonal cross-sectional view of a bearing of the aircraft of FIG. 1.

Referring now to FIG. 2, an orthogonal cross-sectional view of a centrifugal force bearing 112 is shown. In some embodiments, the centrifugal force bearing 112 may be a component of the rotor system 108. The centrifugal force bearing 112 generally comprises a stack of offset metallic shims 114 that are generally bonded to adjacent elastomeric elements 116. The bearing 112 is generally flexible insofar as the elastomeric elements 116 may elastically deform, shear, expand, and/or compress in response to applied forces. In some embodiments, the centrifugal force bearing 112 is provided with a PN 200 that protects the centrifugal force bearing from at least one of oils, ultraviolet radiation, and ozone. While the PN 200 may be applied to the exterior surface of both the shims 114 and elastomeric elements 116, in alternative embodiments, the PN may be applied to only the exterior surface of the elastomeric elements 116. Accordingly, the above-described provision of the PN 200 to the bearing 112 enables the bearing 112 to provide a longer service life without substantially altering a dynamic mechanical performance characteristic of the bearing. In some embodiments, the PN 200 may be not be provided to an entire exterior portion of the shims 114 and elastomeric elements 116 and/or may be provided only to portions of the bearing 112 most likely to be exposed to oil, ultraviolet radiation, ozone, and/or other elastomeric-degrading environments.

Figure 3:
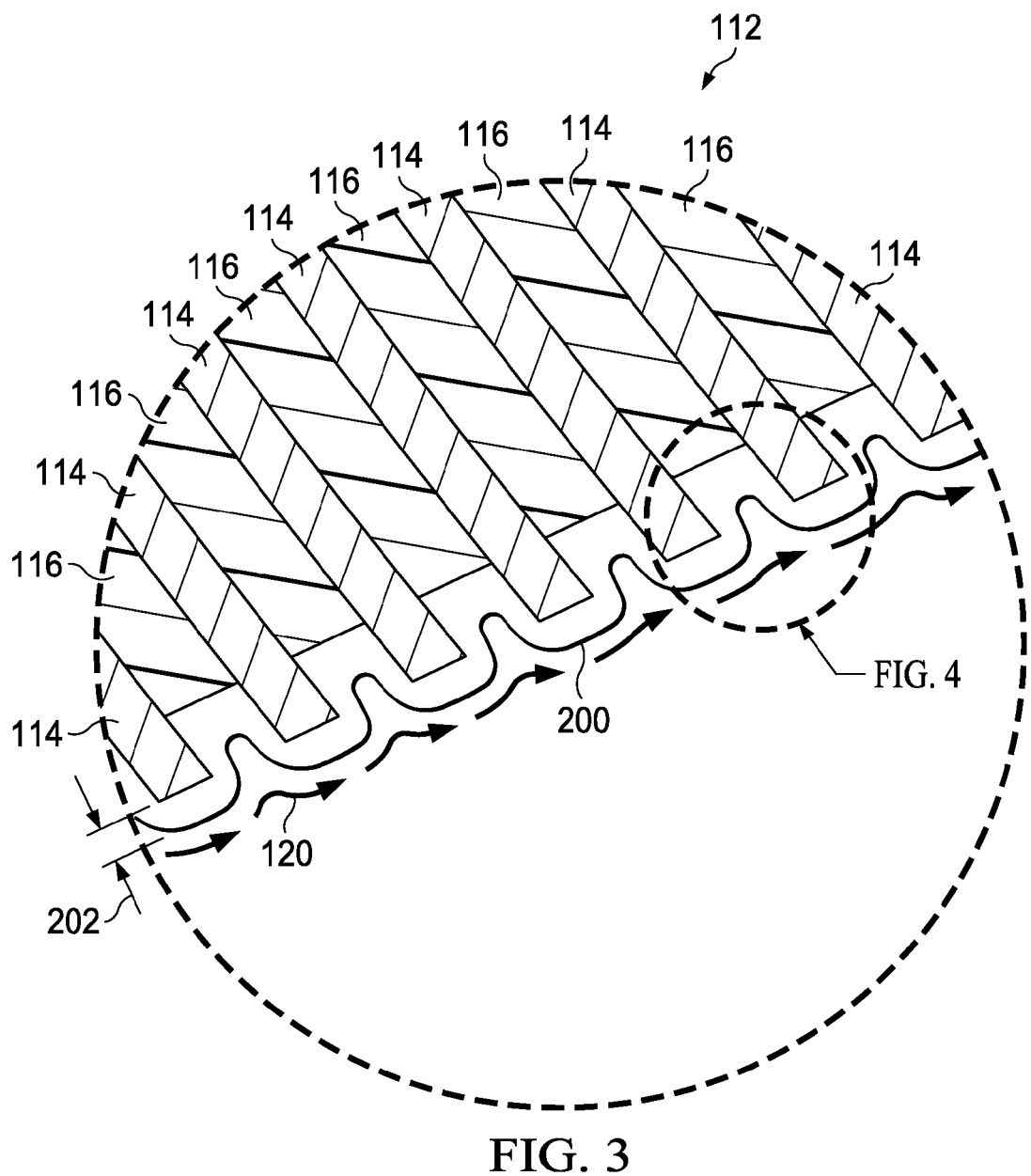
FIG. 3 is a partial view of the bearing of FIG. 2.

Referring now to FIG. 3, a close-up orthogonal partial view of the centrifugal bearing 112 is shown. In this embodiment, the PN 200 is shown in greater detail and generally comprises a thickness 202 measured relative to at least one of the shims 114 and elastomeric elements 116. In some embodiments, the thickness 202 may vary along the exterior path 120. In some embodiments, the thickness 202 may comprise a value of about 0.1 nanometers to about 200 nanometers, about 1 nanometer to about 175 nanometers, about 10 nanometers to about 150 nanometers, about 75 nanometers to about 125 nanometers, about 100 nanometers, and/or any other suitable combination of nanocoating thicknesses. In some embodiments, the PN 200 may be substantially transparent and/or otherwise visually non-obstructive to visual inspection of the bearing 112 for wear and/or damage. In some embodiments, the thickness 202 may be selected to be thinner or thicker at particularly high flexure locations of the bearing 112.

Figure 4:
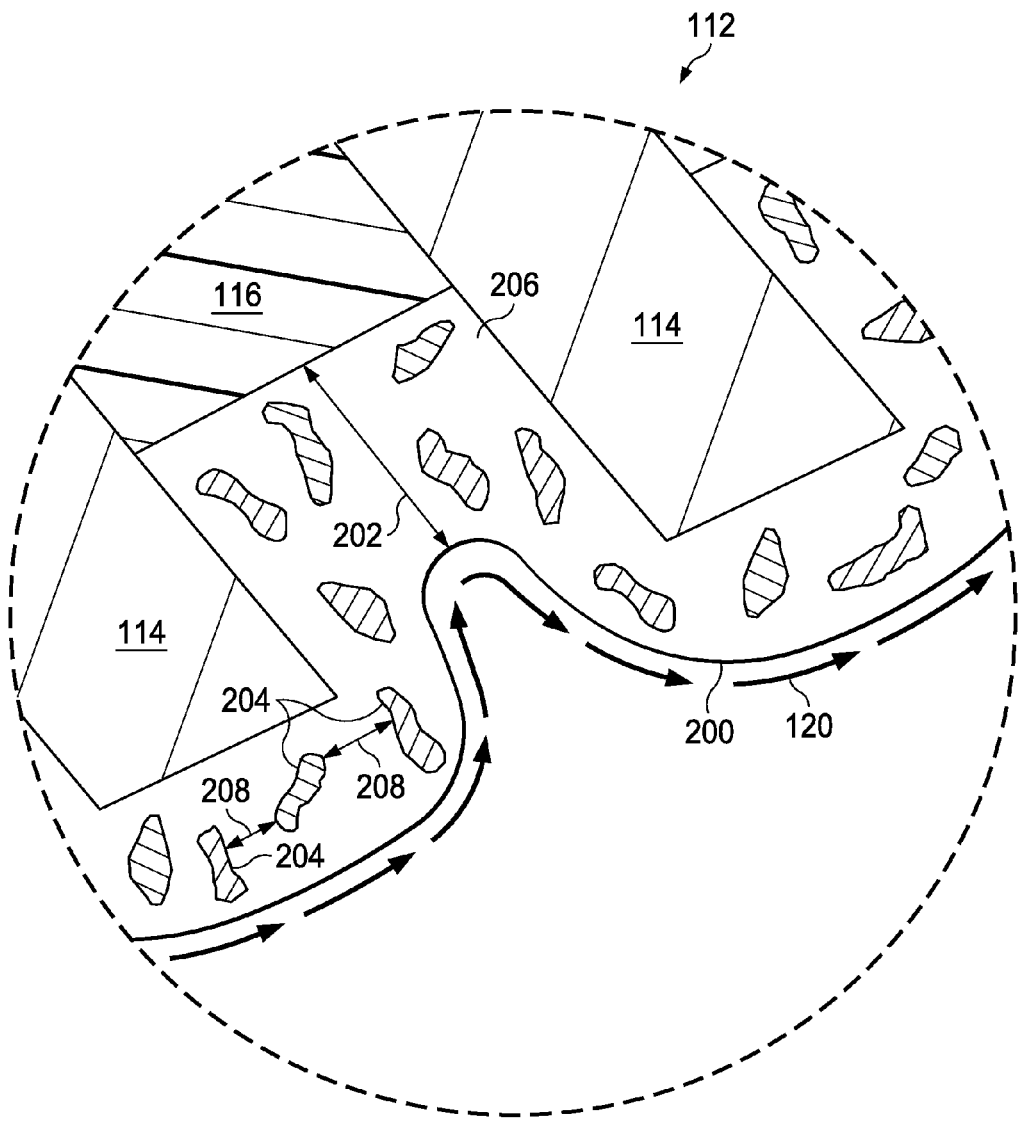
FIG. 4 is a partial view of the bearing of FIG. 3.

Referring now to FIG. 4, an even closer orthogonal partial view of the centrifugal bearing 112 is shown. In this embodiment, the PN 200 is shown in still greater detail and comprises protective particles (PPs) 204. The PPs 204 may comprise any hydrophobic, oleophobic, ultraviolet radiation reflective, ultraviolet radiation sink, ozone repellant, ozone sink, and/or any other material or matter suitable for shielding against oils, ultraviolet radiation, and/or ozone. For example, zinc oxide nanoparticles may be used to minimize degradation due to exposure to ultraviolet radiation. In this embodiment, the PPs 204 are generally disposed within a substrate 206 that may itself comprise one or more of the above-described protective characteristics. In alternative embodiments, the PN 200 may comprise no substrate 206, but rather, may be comprised substantially of PPs 204. Regardless the manner in which the PP 204 locations are maintained relative to the bearing 112, PPs 204 may be spaced relative to each other to provide at least one of a molecularly impervious shield against selected harmful environmental components such as oils, a barrier for capturing and/or reflecting a harmful environmental component such as ultraviolet radiation energy, and/or a barrier for repelling and/or otherwise chemically altering a harmful environmental component such as ozone. Depending on the PP 204 material and the substrate 206 material, a critical path distance may be known and defined as a maximum distance between adjacent PPs 204 of similar material that provides the above-described barrier effectiveness. The distances 208 may change depending on the flexure and/or position of the bearing 112 so that in a first position of the bearing 112 one or more of the above-described barriers is provided while in a second position of the bearing 112 the distances 208 are too large for the same level of barrier effectiveness to be achieved. In some embodiments, the PPs 204 may comprise a variety of maximum dimension sizes 210 and the sizes 210 may comprise values of about 0.1 nanometers to about 200 nanometers, about 1 nanometer to about 175 nanometers, about 2 nanometers to about 100 nanometers, about 3 nanometers to about 50 nanometers, about 5 nanometers, and/or any other suitable combination of protective nanoparticle maximum dimension sizes 210. In some embodiments, the distances 208 and/or sizes 210 may be selected to provide a localized response to deformation of the bearing 112.

Figure 5:
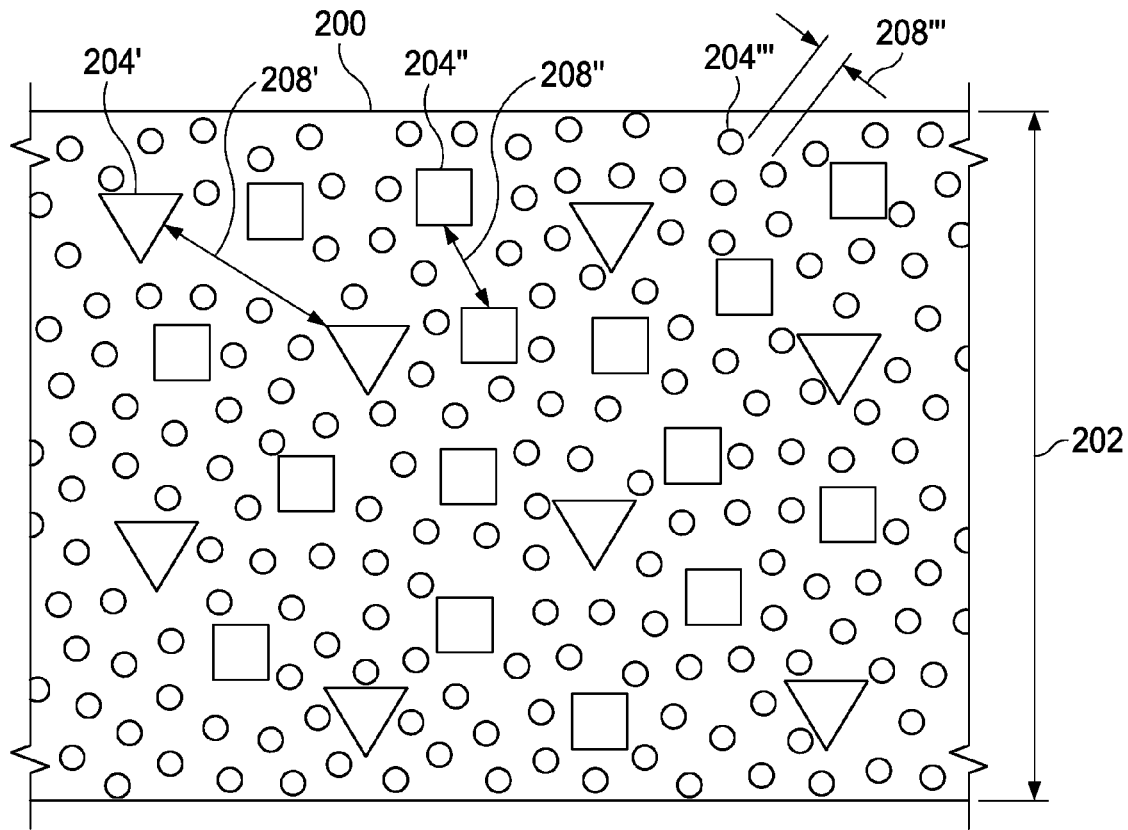
FIG. 5 is a schematic partial view of a protective nanocoating according to an embodiment of the invention.

Referring now to FIG. 5, a schematic view of the PN 200 is shown. While some embodiments of the PN 200 may comprise a single type of PP 204, in some embodiments the PN 200 may comprise a mixture or combination of PP 204 materials. Specifically, the PN 200 may comprise oleophobic PPs 204', ultraviolet radiation reflective PPs 204", and/or ozone reactive and/or repellant PPs 204'". In some cases, the PN 200 may be configured to shield against oil smoke particles comprising a maximum dimension of about 30-1000 nanometers, ultraviolet radiation comprising electromagnetic wavelengths between about 10-400 nanometers, and ozone molecules comprising a maximum dimension of about 1 nanometer. PPs 204' may be dispersed relative to each other within the PN 200 a distance 208' selected in association with the oil smoke particle size and/or in association with an effective oil smoke particle repellant force distance of the PPs 204'. The PPs 204' may be provided in a three dimensional configuration configured to repel, filter, chemically alter, and/or capture the oil smoke particles at one or more depths within the PN 200. PPs 204" may be dispersed relative to each other within the PN 200 a distance 208" selected in association with the ultraviolet radiation wavelength and/or in a three dimensional configuration configured to filter, reflect, and/or capture the ultraviolet radiation at one or more depths within the PN 200. PPs 204'" may be dispersed relative to each other within the PN 200 a distance 208'" selected in association with the ozone particle size and/or in association with an ozone repellant force distance of the PPs 204'". The PPs 204'" may be provided in a three dimensional configuration configured to repel, filter, chemically alter, and/or capture the ozone particles at one or more depths within the PN 200. In some embodiments, the distances 208', 208", 208'" may be carefully controlled by selectively placing individual PPs 204', 204", 204'". In other embodiments, the distances 208', 208", 208'" may be managed statistically as a function of a controlled mixture content, mixing methodology, any other suitable substantially predictable methodology of PP 204', 204", 204'" dispersion within a substrate 206, and/or any other suitable substantially predictable methodology of PP 204', 204", 204'" dispersion within an aggregate mixture.

Figure 6:
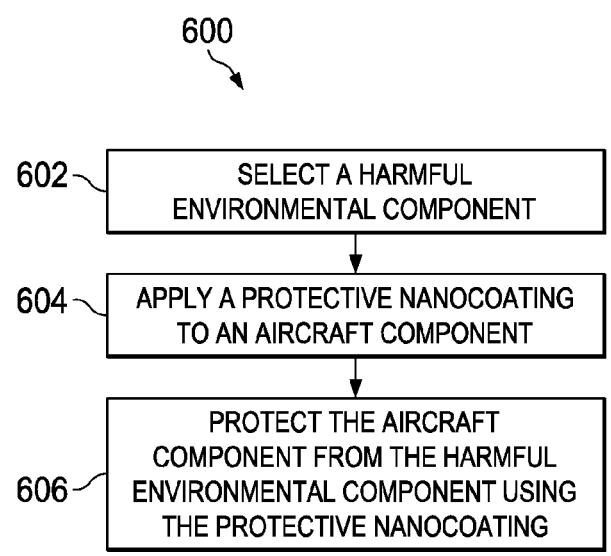
FIG. 6 is a flowchart of a method of protecting an aircraft component according to an embodiment of the disclosure.

Referring now to FIG. 6, a flowchart of a method 600 of protecting an aircraft component is shown. The method 600 may begin at block 602 by selecting at least one harmful environmental component against which the aircraft component is to be protected. In some embodiments, the harmful environmental components may comprise oil, ultraviolet radiation, ozone, and/or any other environmental component harmful to elastomeric components. The method 600 may progress at block 604 by applying a nanocoating, such as PN 200, to the aircraft component to be protected, such as centrifugal bearing 112. In some embodiments, the nanocoating may comprise at least one of a substrate and protective particles configured to impede interaction between the selected harmful environmental components and the aircraft component to be protected. The method 600 may progress at block 606 by exposing the aircraft component comprising the nanocoating to an environment comprising at least one of the selected harmful environmental components and impeding an interaction between the selected harmful environmental components and the aircraft component.

The PN 200 and PNs substantially similar to PN 200 may be utilized to reduce the harmful effects of exposing an aircraft component to any number of harmful environmental components. In some embodiments, a PP 204 may be selected to protect against multiple different harmful environmental components. For example, a PP may be selected that repels oil in addition to reflecting ultraviolet radiation. PNs such as PN 200 may be applied to any aircraft, vehicle, stationary object, material, and/or component thereof that may be exposed to the selected harmful environmental components. Further, the teachings disclosed and applied to the bearing 112 may be similarly applied to any other aircraft and/or aircraft component such as shear bearings for helicopter main and tail rotors. The PNs disclosed herein may be applied to vulcanized elastomeric assemblies, seals, composite panels and/or bushings regardless of whether expected to encounter the selected harmful environmental components. Further, the PNs disclosed herein may be applied to a component of any material construction suitable for receiving a PN. In some cases a PN may be applied to an underlying coating already applied to a component and/or a PN may be provided as an intermediate layer between other coatings and/or devices. In some embodiments, a PP may comprise carbon nanotubes. In some embodiments, the carbon nanotubes may be provided only in a PN, only integral to an elastomeric component, and/or in both a PN and an elastomeric component. The elastomeric components may comprise rubber. In some embodiments, the PN may be applied to a component by spraying, painting, electrostatically depositing, and/or any other suitable manner of applying a nanocoating to a surface.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft component, comprising:
    an exterior surface configured to flex in response to applied forces; and
    a protective nanocoating carried by the exterior surface;
    wherein the protective nanocoating protects the aircraft component from oil, ultraviolet radiation, and ozone.

2. The aircraft component of claim 1, wherein the exterior surface comprises an exterior surface of a bearing.

3. The aircraft component of claim 2, wherein the bearing comprises an elastomeric material.

4. The aircraft component of claim 3, wherein the bearing comprises offset metallic shims that bound the elastomeric material, and wherein the protective nanocoating is applied only to the elastomeric material of the exterior surface.

5. The aircraft component of claim 1, wherein the protective nanocoating comprises a thickness of about 0.1 nanometers to about 200 nanometers.

6. The aircraft component of claim 1, wherein the protective nanocoating comprises protective particles comprising a maximum dimension of about 0.1 nanometers to about 200 nanometers.

7. The aircraft component of claim 6, wherein the protective particles are configured to protect against at least one of oil, ultraviolet radiation, and ozone;
    wherein a first subset of the particles provides protection against oil smoke particles;
    wherein a second subset of the particles provides protection against ultraviolet radiation;
    wherein a third subset of the particles provides protection against ozone particles; and
    wherein the first subset of the particles, the second subset of the particles, and the third subset of the particles are evenly dispersed in the protective nanocoating.

8. The aircraft component of claim 1, wherein the exterior surface comprises a first area having a first flexure and a second area having a second flexure that is greater than the first flexure, wherein a thickness of the protective nanocoating at the first area is greater than a thickness of the protective nanocoating at the second area.

9. The aircraft component of claim 1, wherein the protective nanocoating is substantially transparent.

10. An aircraft, comprising:
    an engine;
    a fuselage; and
    a component, comprising:
        an exterior surface configured to flex in response to applied forces; and
        a protective nanocoating carried by the exterior surface;
        wherein the protective nanocoating protects the component from oil, ultraviolet radiation, and ozone.

11. The aircraft of claim 10, wherein the component comprises a centrifugal force bearing.

12. The aircraft of claim 10, wherein the component comprises a shear bearing.

13. The aircraft of claim 10, wherein the protective nanocoating comprises a thickness of about 0.1 nanometers to about 200 nanometers.

14. The aircraft of claim 10, wherein the protective nanocoating comprises protective particles comprising a maximum dimension of about 0.1 nanometers to about 200 nanometers;
- wherein a first subset of the particles provides protection against oil smoke particles;
- wherein a second subset of the particles provides protection against ultraviolet radiation;
- wherein a third subset of the particles provides protection against ozone particles; and
- wherein the first subset of the particles, the second subset of the particles, and the third subset of the particles are evenly dispersed in the protective nanocoating.

15. A method of protecting an aircraft component, comprising:
- protecting an exterior surface of an aircraft component with a protective nanocoating applied to the exterior surface of to the aircraft component, the exterior surface configured to flex in response to applied forces; and
- wherein the protective nanocoating protects the aircraft component from oil, ultraviolet radiation, and ozone.

16. The method of claim 15, wherein the protective nanocoating comprises a thickness of about 0.1 nanometers to about 200 nanometers.

17. The method of claim 15, further comprising providing the protective nanocoating with protective particles comprising a maximum dimension of about 0.1 nanometers to about 200 nanometers.

18. The method of claim 15, further comprising providing the protective nanocoating with protective particles comprising a maximum dimension of about 0.5 nanometers to about 10 nanometers.

19. The method of claim 15, wherein the protective nanocoating is applied directly to an exterior surface of the aircraft component.

20. The method of claim 15, wherein the aircraft component comprises at least one of a centrifugal force bearing and a shear bearing.

* * * * *

UNITED STATES PATENT AND TRADEMARK OFFICE
CERTIFICATE OF CORRECTION

PATENT NO. : 9,352,829 B2  
APPLICATION NO. : 13/789273  
DATED : May 31, 2016  
INVENTOR(S) : Daniel P. Sottiaux et al.

Page 1 of 1

It is certified that error appears in the above-identified patent and that said Letters Patent is hereby corrected as shown below:

Title Page, Item 56 in Column 2 (Other Publications), In Line 1, delete "ÖztaÖztaş ," and insert -- Öztaş, --, therefor.

Title Page, Item 56 in Column 2 (Other Publications), In Line 1, delete "OrtaOrtaç ," and insert -- Ortaç, --, therefor.

Title Page, Item 57 in Column 2 (Abstract), In Line 4, delete "nano coating" and insert -- nanocoating --, therefor.

Signed and Sealed this  
Second Day of August, 2016

Michelle K. Lee  
*Director of the United States Patent and Trademark Office*